Figure 1:
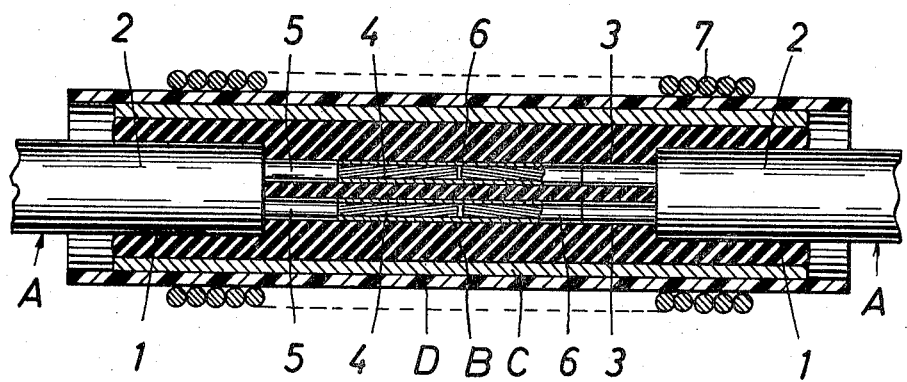

United States Patent
Eftestol et al.

[15] 3,705,256
[45] Dec. 5, 1972

[54] ARRANGEMENT IN JOINING ELECTRIC INSULATED MULTI-CORE CABLES

[72] Inventors: Bard Eftestol; Tor Osteng, both of Raufoss, Norway

[73] Assignee: A/S Raufoss Ammunisjonsfabrikken, Raufoss, Norway

[22] Filed: Dec. 1, 1970

[21] Appl. No.: 94,098

[30] Foreign Application Priority Data

Dec. 2, 1969 Norway ..................... 4753/69

[52] U.S. Cl. ................ 174/88 R, 29/421 E, 29/628, 174/84 C, 339/276 E
[51] Int. Cl. ........................................... E02g 15/08
[58] Field of Search ........ 174/88 R, 88 S, 94 R, 84 C; 339/276 S, 275 E, 276 R, 223 R; 29/628, 421 E

[56] References Cited

UNITED STATES PATENTS

| | | |
|---|---|---|
| 2,367,206 | 1/1945 | Davis .............. 339/276 E UX |
| 3,015,684 | 1/1962 | Schneider ............... 174/88 R |
| 3,542,276 | 11/1970 | James ............... 174/94 R UX |

Primary Examiner—Darrell L. Clay
Attorney—Waters, Roditi, Schwartz & Nissen

[57] ABSTRACT

The present invention relates to an arrangement in joining insulated electric multi-core cable comprising a connecting tube of an elastomeric material, a metal tube enclosing said tube, an axial bore having a diameter corresponding to the outer diameter of the cable to be joined extending from each end of the connecting tube to a selected depth from said end, a number of axial parallel bores connecting said end bores and adapted to receive the respective insulated phase conductors, a centrally positioned copper tube in each of said parallel bores adapted to receive adjacent exposed ends of said conductors, the arrangement being such that when said metal tube is compressed the connecting tube is compressed around the end parts of the cable and around the copper tubes pinching same around said conductors procuring a mechanical and electrical effective joint protected against intrusion of moisture.

1 Claim, 2 Drawing Figures

PATENTED DEC 5 1972　　3,705,256

ARRANGEMENT IN JOINING ELECTRIC INSULATED MULTI-CORE CABLES

The present invention relates to an arrangement for joining insulated multi-core cables.

The object of the invention is to make possible that cables of the above named kind under all encountered circumstances can be joined in a rapid and simple manner without need of attending mechanical pressure tools and in such a manner that a satisfactory electrical and mechanical contact is obtained and at the same time the joining places is insulated effectively against intrusion of moisture.

According to the invention this is obtained thereby that a connecting tube of an elastomeric material is enclosed in a metal tube and is at each end provided with an axial bore having a diameter corresponding to the outer diameter of the cable to be joined and a selected depth, a number of axial bores parallel to the axis of the connecting tube connecting said end bores and having a diameter adapted for insertion of the respective phase conductors with the insulation thereon, a copper tube positioned centrally in each of said connecting bores having a length shorter than that of said connecting bore and an inner diameter adapted to receive exposed end parts of opposite phase conductors, the arrangement being such that when said metal tube is compressed the compression is transferred through the connecting tube to the copper tubes which thereby are pinched around the conductors and procure electrical and mechanical connection between same at the same time as the connecting tube is clamped around the outer insulation of the cable and procures an effective tightening against intrusion of moisture.

Figure 2:
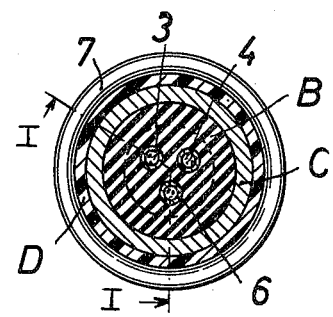

The invention will be closer described below with reference to the accompanying drawing illustrating as an example a preferred embodiment of the invention and in which:

FIG. 1 is a longitudinal sectional view of a joint for an electric multi-core cable before detonation along the line I—I in FIG. 2, and FIG. 2 is a cross-section of the joint according to FIG. 1.

As shown in the drawing the adjoining ends A of the cables are connected by means of a connecting tube B having an exterior sleeve or tube C of metal.

The tube B has a length adapted to the dimensions of the cable and is produced of an elastomeric material such as plastic, rubber or similar electric insulating material.

In the embodiment shown in the drawing a tube of PVC is used, but also other types of plastic material may be used. At each end the tube B is provided with an axial bore 1 having a diameter adapted to receive the outer plastic mantle or insulation 2 of the cable and a suitable depth from the end of the tube. The bores 1 are connected through a number, here three, bores 3 parallel to the axis of the tube B and each with a diameter adapted for insertion of the individual phase conductors 4 with the insulation 5 thereon. As will be understood the number positions of the bores 3 are adapted to the number and positions of the phase conductors of the cable to be joined, and the cable may comprise only a single conductor.

Each of the cable ends to be joined is prepared in the manner that the outer insulation 2 is removed in such a length that the individual phase conductor with the insulation thereon projects from the outer insulation 2 a distance approximately corresponding to half the length of the bores 3 in the tube B. Thereafter each of the phase conductors 4, preferably consisting of copper, is stripped in a length appropriate for joining.

The outer tube C may consist of aluminium or any other suitable metal or metal alloy.

Further the joint comprises metal tubes 6, preferably of copper, serving to connect the respective phase conductors 4. Each of said tubes 6 has an outer diameter adapted for insertion in the bore 3 and a length corresponding to the distance between the opposite ends of the insulation 5 on the phase conductors 4 which are inserted in respective bores and the stripped portions of which are inserted into said tube 6 as shown.

After preparing the cable ends in the above described manner and the insertion thereof, each from opposite ends of the tube B, with the adjacent ends of the conductors 4 received in the copper tubes 6, the exterior metal tube C is compressed and this compression is transferred through the tube B to the enclosed copper tubes 6 which thereby are pinched about the conductors 4 so that a sufficient electrical and mechanical contact are obtained. The parts of the tube B which do not enclose said copper tubes 6 are compressed around the insulation 5 of the single phases and the external insulation of the cable so that the places of joining are effectively insulated against intrusion of moisture. As a further security in that connection a suitable tightening means may be applied on the outer surface of the ends of the cables before insertion thereof into the connecting tube.

The compression of the metal tube C may take place in any known manner by means of conventional presses or pressing tools.

However, in order to make joining of cables of the kind referred to possible under all encountered circumstances without the need of particular presses or pressing tools the necessary compression pressure according to the present invention is obtained by detonation of a suitable explosive charge such as detonating fuse of which a layer 7 is wound spirally around the metal tube C.

In order to protect the surface of the metal tube C against local melting and crater forming it is preferred to use between said tube C and the explosive charge 7 an intermediate layer D which may consists of a hose of plastic, rubber or similar plastic deformable material, threaded on said tube C.

During detonation of the explosive charge 7 the tube C is compressed and the compression is transferred radially inwards through the connecting tube B to the enclosed copper tubes 6 which are pinched around the conductors 4 so that a sufficient electrical and mechanical contact are obtained between said components at the same time as the tube B is compressed around the insulation 5 of the conductors 4 and the external insulation 2 of the cable ends A whereby the places of joining are effectively protected against intrusion of moisture.

I claim:

1. Arrangement for forming a detonation joint for an insulated electric multi-core cable, comprising a connecting tube of an elastomeric material, said tube having an axial bore of a diameter corresponding to the outer diameter of the cable to be joined and extending inwardly from each end of said connecting tube to a predetermined depth, said tube further having a number of axial bores extending parallel to the axis of the connecting tube inter-connecting said end bores and having diameters adapted to each receive a respective phase conductor with the insulation thereon from opposite ends thereof, a copper tube positioned centrally in each of said connecting bores and having a length shorter than that of said connecting bore, said copper tubes each having an inner diameter adapted to receive exposed end portions of said opposite phase conductors, a metal tube encompassing the peripheral surface of the connecting tube and forming an outer casing for the joint, an external layer of an explosive being positioned about said metal tube, and a sleeve of elastic material being positioned between said metal tube and the layer of explosive, the arrangement being such that in response to detonation of the explosive the metal tube is adapted to be compressed and the compression transferred radially inwards through the connecting tube, to the copper tubes, said tubes being pinched about the conductors to form a firm electrical and mechanical contact, and between the insulation of the conductors and the cable ends.

* * * * *